Aug. 31, 1965 G. C. HARTLEY 3,204,037

AUTOMATIC TELECOMMUNICATION EXCHANGES

Filed Aug. 30, 1960 4 Sheets-Sheet 1

Inventor
G. C. HARTLEY

By

Aug. 31, 1965 G. C. HARTLEY 3,204,037

AUTOMATIC TELECOMMUNICATION EXCHANGES

Filed Aug. 30, 1960 4 Sheets-Sheet 2

Inventor
G. C. HARTLEY

By Paul W. Hemminger
AGENT

Aug. 31, 1965 G. C. HARTLEY 3,204,037

AUTOMATIC TELECOMMUNICATION EXCHANGES

Filed Aug. 30, 1960 4 Sheets-Sheet 3

Inventor
G. C. HARTLEY

By Paul W. Hemminger

Aug. 31, 1965 G. C. HARTLEY 3,204,037

AUTOMATIC TELECOMMUNICATION EXCHANGES

Filed Aug. 30, 1960

4 Sheets-Sheet 4

Inventor
G. C. HARTLEY

By [signature]
Attorney

United States Patent Office 3,204,037
Patented Aug. 31, 1965

3,204,037
AUTOMATIC TELECOMMUNICATION EXCHANGES

George Clifford Hartley, Aldwych, London, England, assignor to International Standard Electric Corporation, New York, N.Y.

Filed Aug. 30, 1960, Ser. No. 52,937
Claims priority, application Great Britain, Oct. 2, 1959, 33,481/59
6 Claims. (Cl. 179—18)

This invention relates to automatic telecommunication systems, of the type in which communication is set up by means of co-ordinate multi-switches.

A system of this type is described in U.S. Patent No. 2,872,527, issued February 3, 1959, to F. H. Bray et al., in which the co-ordinate multiswitches are composed of cold-cathode gas filled discharge tubes. The present invention is an improvement of the system disclosed in the noted patent.

The present invention is similar to that described in the above-mentioned patent as regards the general facilities and trunking arrangements, but differs in that the coördinate multi-switches are composed of semi-conductor diodes of the type known as "pnpn."

The use of cold-cathode gas-filled discharge tubes, of the type and for the purposes referred to in the above-mentioned patent, has certain disadvantages. One of these disadvantages is that each gas-tube in each switching stage must have its own individual direct current circuit for switching it into conducting condition and maintaining it in the conducting condition. Thus, the several switching stages in a through connection must be isolated as regards the direct current circuits by transformers, which are unavoidably expensive and bulky and also gives a certain amount of unwanted speech attenuation. Another disadvantage is that, in order to provide the correct current and voltage conditions for operating the gas-tube and for indicating the busy or free condition of the switching path, a greater amount of electrical power is required than is necessary for transmitting speech through each switching stage. Other improvements relate to reducing the voltage required for the gas-tube or other switching element, lengthening its useful life, and reducing its size and the amount of ancillary circuitry required.

In principle, various types of electrical elements such as vacuum tubes or transistors may be connected in various combinations to produce a workable system. In a coordinate multi-switch system however there is a large number of switching elements, they have to be economically mounted and efficiently interconnected to form a switching network. It is therefore desirable that each element should be small and self-contained with a minimum of associated circuitry; their impedance should be very high in the normal unoperated condition and very low in the operated condition to obtain good switching and transmission characteristics; that switching time should be short so that connections can be made on a one-at-at-time basis, and that a minimum of D.C. power be necessary to maintain the element switched. With efficient design of the network switching circuits and the control circuits, these desirable characteristics may be obtained by using the "pnpn" diode as the switching element.

The "pnpn" diode is a two-terminal semi-conductor device and has been described in, for instance, pages 1174 et seq. of "Proceedings of the I.R.E. for September 1956." It is one of the class of electrical devices exhibiting the property that over a certain range of current values the voltage across the device falls rapidly as the current through it rises, so that the differential resistance, or rate of change of voltage with current, is negative. Below this range the voltage may be very high, giving the equivalent of a very high resistance, and above the range it may be very low, giving the equivalent of a very low resistance. If these resistances are high and low enough respectively, and if the range is short enough in respect of current values, the device may be used as a static switch, which is operated by an increase of current and restored to normal by a decrease or disconnection of current.

The use of this device as a switching element has been described in U.S. Patent No. 2,855,524, issued October 7, 1958, to W. Shockley, wherein a simple embodiment involving one switching stage with transformer coupling at each end, is shown and wherein the use of multiple stages for a large exchange is mentioned. The particular characteristics of the "pnpn" diode make it possible to provide multiple stages by the use of these diodes in series, thereby providing an efficient and economical arrangement as disclosed by the present invention.

According to the invention therefore there is provided an automatic telecommunication exchange in which a connection between an incoming and an outgoing line is established over a path which includes a plurality of semiconductor diodes of the type known as "pnpn" connected in series.

Also according to the invention there is provided an automatic telecommunication exchange comprising a number of stages of co-ordinate multi-switches interconnecting a set of inlets of said multi-switches and a set of outlets of said multi-switches, in which the device forming the connection between any inlet wire and any outlet wire of a multi-switch is a semiconductor diode of the type known as "pnpn," and in which, after a free path has been found by test equipment between the desired inlet to the multi-switches and the desired outlet from the multi-switches, the wanted connection is established by switching control means through a plurality of the said diodes, one for each stage in series, over the free path found.

An embodiment of the invention will now be described with reference to the accompanying drawings, in which:

FIG. 2 should be placed to the right of FIG. 1, and FIG. 3 to the right of FIG. 2.

Figure 1:
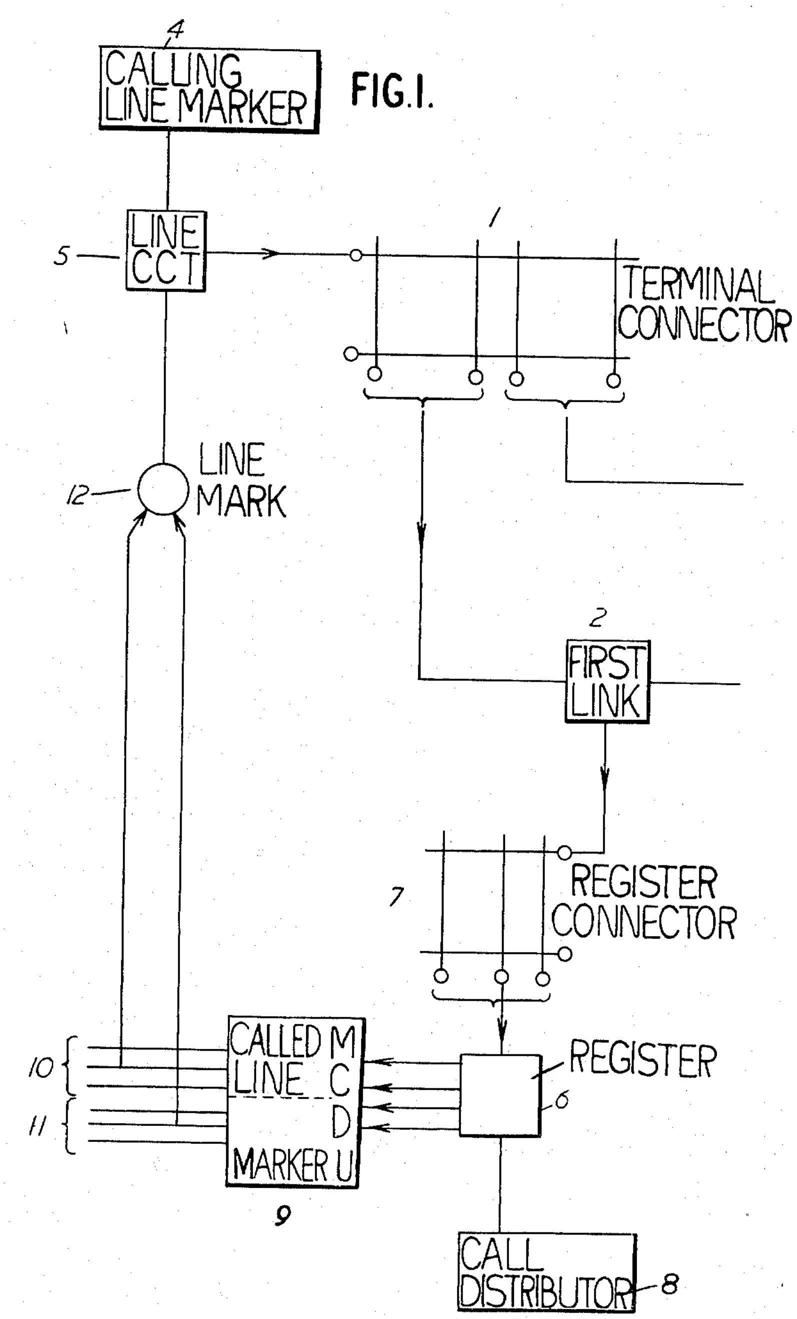
FIGS. 1, 2 and 3 show a trunking diagram of an automatic telephone exchange according to the invention.
Figure 2:
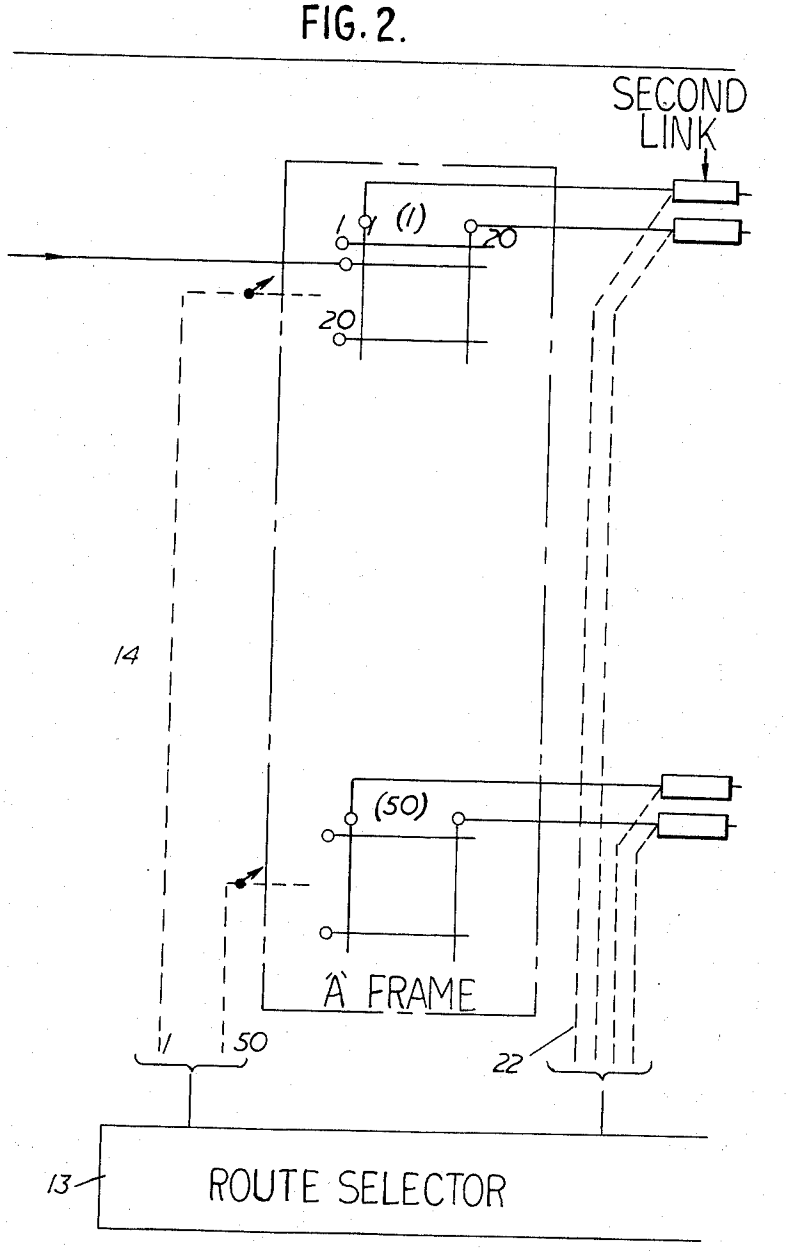
Figure 3:
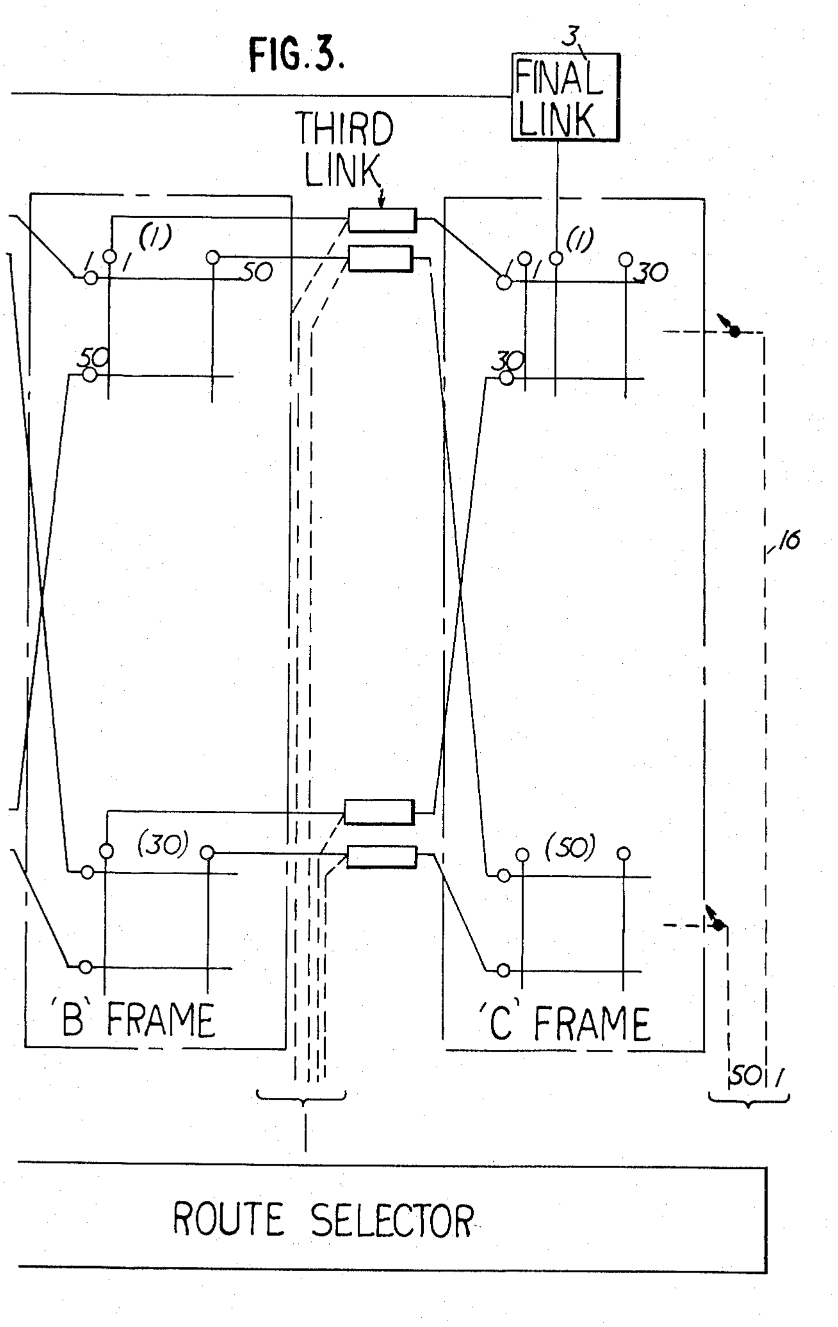

FIGS. 1, 2 and 3, showing the trunking diagram, are the same as disclosed in U.S. Patent No. 2,872,527, to which reference may be made for a General Description of the trunking arrangements. When a call has been initiated, a First Link 2 (FIG. 1) is seized and marks its associated inlet on the corresponding switch on the "A" Frame. When the Register and Called Line Marker have functioned to determine the identity of the wanted line, a Final Link 3 (FIG. 3) is also seized and marks the associated outlets on the corresponding switch on the "C" Frame. The Route Selection 13 (FIGS. 2 and 3) will now select a free path to connect the marked inlet on the "A" Frame to the marked outlet on the "C" Frame, through co-ordinate multi-switch elements which, according to the present invention, are semi-conductor "pnpn" diodes.

Figure 4:
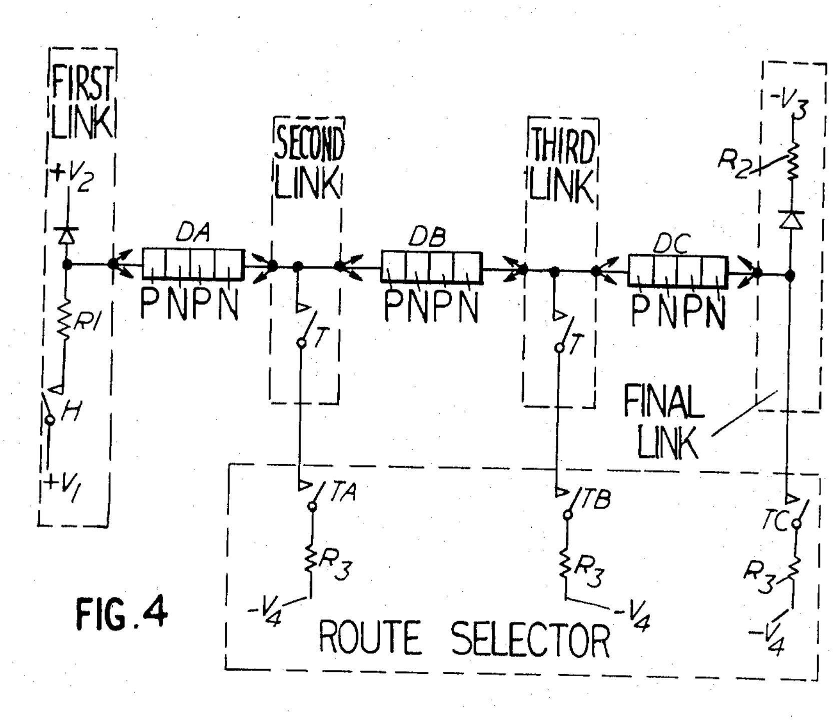
FIG. 4 illustrates the principle by which a plurality of "pnpn" diodes may be used to extend a speech connection through several switching stages.

Referring now to FIG. 4, there is shown in its simplest form one of the paths from a marked inlet on the "A" Frame (at the left of the diagram) to a marked outlet on the "C" Frame (at the right of the dagram). This figure is intended to show the process of switching a free path through the three stages. The method of testing for the free condition of the path will be described later. It will be understood that the diagram shows the path over one leg of the two-wire speech circuit through the switching network, and that another similar path is required for the other leg which is controlled along with the path shown. Parts of the First and Final Links, and of the two Intermediate links, are shown, and the "pnpn" diodes DA, DB, DC, are the switching elements in the A, B, C, frame switches respectively through which the chosen path is to be connected. The symbol used for these diodes is the schematic representation generally adopted for semi-conductor structures.

By referring to FIGS. 2 and 3, it will be appreciated that each diode DA, DB, DC, is multipled at its left-hand terminal to several other similar diodes, each leading to a separate succeeding link, and at its right-hand terminal to several other similar diodes, each leading from a separate preceding link. This is sufficiently indicated by the commoning symbols on FIG. 4.

The "C" Frame outlet is marked by the application from the Final Link of a small negative voltage $V_3$ through a resistance $R_2$ of the order of 100 ohms and an ordinary rectifier. Since this link is not yet connected to the switching network, all the diodes DC on the on the marked outlet will be in their high resistance non-condutive condition, and are not affected by the low negative voltage $V_3$.

The "A" Frame inlet is marked by the application of a high positive voltage $V_1$ through a contact of relay H (winding not shown) and a resistance $R_1$ in the First Link. Relay H was operated when this First Link was associated with the calling subscriber's line, in a manner similar to that used in the aforementioned Patent No. 2,872,527 and it is not described further in the present specification. A clamping rectifier connects a medium positive voltage $V_2$, which is less than $V_1$, to the "A" Frame inlet, so that a current may now flow from voltage $V_1$ to $V_2$ having the correct value for switching a "pnpn" diode but still allowing the clamping rectifier to clamp the inlet at voltage $V_2$. The inlet is thus now marked by the positive voltage $V_2$. Since this First Link is not yet connected to the switching network all the diodes DA on the marked inlet will be "non-conductive and voltage $V_2$ is not sufficient to affect them.

As will be described later, all the Intermediate Links through which paths may be possible between the marked inlet and outlet concerned will be tested and relay T (winding not shown) will have been operated in all of these which are free. The Route Selector (FIGS. 2 and 3) now functions in a similar manner to that described in the aforementioned specification, to scan the condition of the possible paths to find one for which both second and third intermediate links are simultaneously free, the free condition being indicated by the operated contacts of relay T and a circuit not shown in FIG. 4 but to be described later.

Let FIG. 4 now represent the chosen free path. Contacts TA, TB, TC, represent circuits in the Route Selector for connecting a medium negative voltage $V_4$ via high resistances $R_3$ to the two intermediate and the final links in a definite sequence. On the closure of TA voltage $V_4$ is applied to diode DA, and the combined voltage $V_2$ plus voltage $V_4$ is sufficient to switch DA to the low-voltage condition, the values of $R_3$ being such as to allow the current to rise, as DA switches, to the correct value to ensure complete switching. When DA has reached the low-voltage condition, the voltage at the inlet still tends to be higher than $V_2$, due to the choice of $V_1$ and $R_1$, so that the inlet is still clamped at voltage $V_2$.

When switching of DA has been recognised by the Route Selector by reason of the current rise in the TA circuit, TB closes so that diode DB switches similarly, the voltage drop across DA being too small to affect conditions for DB. When DB has switched, the Route Selector opens TA and closes TC, diodes DA and DB now receiving the required holding current in series via TB. Diode DC then switches likewise and TB is opened. The rectifier shown in the First Link isolates voltage $V_3$ from the circuit while DC is switching. When however DC has switched, the voltage at the inlet to the Final Link rises above the value of $V_3$ so that this rectifier conducts. TC is opened, and the Route Selector is disconnected from the network in the usual manner.

Since resistance $R_2$ in the Final Link is small, and the "pnpn" diodes are now all in the low-voltage condition, the voltage at the "A" Frame inlet drops to a value near $V_3$, so that the "A" Frame inlet is unclamped. The three diodes now "hold" in series with contact H in the First Link and the current rises to the working value which gives an adequate margin for holding the diodes "on" in spite of subsequent testing operations or signal or speech modulation. The potential at any point between "A" Frame inlet and "C" Frame outlet will be of the same order as the small negative voltage $V_3$, but slightly less negative towards the inlet by the small drop across the diodes. This potential now marks the second and third links busy, as will be described below.

The circuit may be coupled to the originating and terminating portions of the exchange by means of transformers, not shown in FIG. 4 but mounted on the First and Final Links respectively. Thus the main part of the switching network gives no attenuation of transmission loss except for the very small impedance of the three diodes in each leg of the connection. The power consumed in holding the connection is very much less than required when gas-tubes are used. The fact that the whole connection is very near ground potential minimizes the general level of cross-talk.

The voltage and current values required depend mainly on the characteristics of the "pnpn" diode used. Representative values for voltages $V_1$, $V_2$, $V_3$, $V_4$ may be +60, +35, −5. and −45 volts respectively. The working current may be about 20 ma., and the "pnpn" diode voltage drop in the switched condition would be less than 1 volt.

Figure 5:
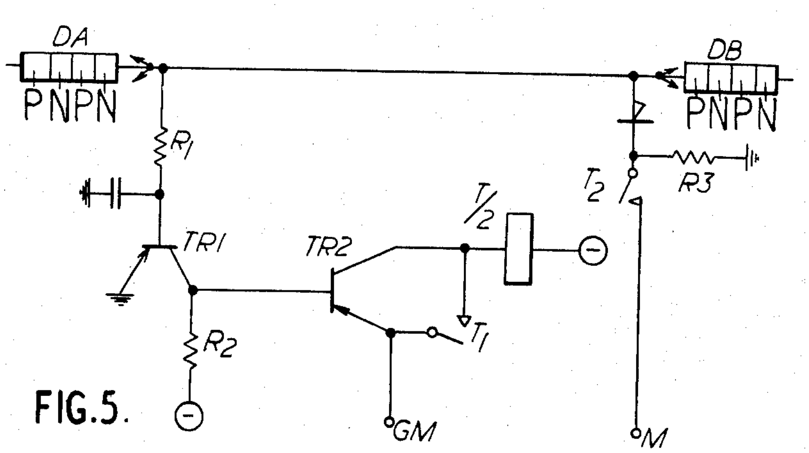
FIG. 5 shows the main features of a circuit which may be used for testing and marking a switching stage.

FIG. 5 shows an arrangement for the testing and marking functions in the second or third link. According to this arrangement two transistors TR1 and TR2 and a relay T are provided. TR1 is connected with its emitter grounded, its base connected to the line via a high resistance $R_1$ with a by-pass capacitor for speech currents, and its collector connected to a suitable negative voltage through a suitable resistance $R_2$.

With suitable value of $R_1$ this connection to the line will give negligible transmission loss, since the switched "pnpn" diode connection is a low impedance circuit. At the same time this resistance will assist in controlling the cross-talk which might arise from the high impedance condition of the idle "pnpn" diode circuits. The collector of TR2 is connected to relay T, the base of TR2 is connected to the collector of TR1, and the emitter of TR2 is grounded at terminal GM which is grounded from a group marking relay (not shown).

A group marking relay is associated with each switch on the "A" and "C" Frames, and is operated by the Route Selector so that the terminal GM is grounded on all second links which can be reached from the A switch concerned, and by a similar arrangement, not shown, on all third links which can connect to the C switch concerned. Transistor TR1 will conduct if the line is busy, due to the small negative potential on the "pnpn" diode, so that the collector of TR2 is at ground potential and TR2 is blocked. Conversely if the line is free, TR2 is not blocked. When therefore the group-marking relay operates, transistor TR2 conducts, and operates relay T in all free links which can provide a path between the marked "A" Frame inlet and "C" Frame outlet.

Relay T locks over contact T1, so that it is independent of TR1 which may subsequently conduct even on a free line owing to marking operations, and at contact T2 marks the terminal M from ground through resistor R3. This M terminal marking thus indicates a free link of the Route Selector, which performs a scanning operation as described in the aforementioned U.S. patent. When a free through path has thus been selected the same circuit through terminal M and contact T2 is used to connect the switching voltage $V_4$ to the "pnpn" diode, as described previously. The resistance of R3 is high enough to have no affect on this operation. The associated rectifier isolates the Route Selector scanning operation from the link but passes the negative switching current.

The aforegoing has described the embodiment of the invention as regards a method of connecting "pnpn" diodes to provide a switching network, a method of testing so as to determine the state of the diode circuits, and a process for switching the diodes to the low-voltage conditions. It will be realized that other functions, such as supervisory signalling over the speech path, and details of connecting to the Route Selector, have to be added, but these are not shown or described. It will also be appreciated that it might be advantageous to perform the functions of relay T by the use of a transistor or in other ways, instead of by the electro-mechanical relay shown.

It is to be understood that the foregoing description of specific examples of this invention is not to be considered as a limitation on its scope.

What I claim is:

1. An electronic switching network having a plurality of inputs and outputs interconnected by a plurality of series-connected bistable PNPN devices each having a high impedance state and a low impedance state, means for applying an input marking potential and a holding potential to any desired input, means including a clamping circuit for masking said holding potential and maintaining said desired input at said input marking potential, means for applying an output marking potential to any desired output, test means for selecting a path between said marked input and said marked output, which path includes a plurality of series-connected devices in their high impedance state, means for sequentially applying an operating potential to each of the said devices in said selected path to switch the last-said devices to their low impedance state and for removing said operating potential from each device responsvie to the said switching operation, and means responsive to the said removal of said operating potentials for disabling said clamping circuit to automatically render said holding potential effective.

2. An electronic switching network as set forth in claim 1 wherein said potentials applied to said input are ing potential includes means for maintaining the potential at every point in said selected path at substantially ground potential.

3. An electronic switching network as set forth in claim 1 wherein said potentials applied to said input are positive and said potential applied to said output is negative.

4. An electronic switching network as set forth in claim 1 wherein each said path includes first, second and third bistable devices and wherein the said means for applying an operating potential includes a first circuit branch connected to the junction of the first and second devices, a second circuit branch connected to the junction of the second and third devices and a third circuit branch connected to the said desired output.

5. An electronic switching network as set forth in claim 4 wherein control means are provided for energizing said first circuit branch to switch said first device, for energizing said second circuit branch to switch the second device responsive to the said switching of the first device for de-energizing said first circuit branch and energizing the said third circuit branch to switch the third device responsive to the said switching of the second device, for de-energizing the second circuit branch responsive to the switching of said third device, and for de-energizing the said third circuit branch responsive to the said input marking potential appearing on said desired output through said switched devices.

6. An electronic switching network as set forth in claim 1 wherein said bistable devices comprise PNPN diode switches.

References Cited by the Examiner

UNITED STATES PATENTS

| | | | |
|---|---|---|---|
| 2,946,855 | 7/60 | Hussey | 179—18 |
| 2,951,124 | 8/60 | Hussey et al. | 179—18 |
| 2,951,125 | 8/60 | Andrews | 179—18 |
| 3,020,353 | 2/62 | Heetman | 179—18 |
| 3,027,427 | 3/62 | Woodin | 179—18 |
| 3,033,936 | 5/62 | Simms | 179—18 |

ROBERT H. ROSE, *Primary Examiner.*

L. MILLER ANDRUS, WALTER L. LYNDE, *Examiners.*